（12）United States Patent
Robertson

(10) Patent No.: US 8,378,608 B2
(45) Date of Patent: Feb. 19, 2013

(54) SYSTEMS, DEVICES, AND/OR METHODS FOR MANAGING DRIVE POWER

(75) Inventor: Daniel W. Robertson, Cumming, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 567 days.

(21) Appl. No.: 12/564,548

(22) Filed: Sep. 22, 2009

(65) Prior Publication Data

US 2010/0076612 A1 Mar. 25, 2010

Related U.S. Application Data

(60) Provisional application No. 61/098,958, filed on Sep. 22, 2008.

(51) Int. Cl.
    H02P 27/00 (2006.01)
(52) U.S. Cl. .................... 318/438; 318/729; 318/801
(58) Field of Classification Search .................. 318/438, 318/729, 801, 803, 800, 34, 255, 432, 722, 318/727, 762, 799, 807, 811; 172/3; 323/205; 363/65, 71; 37/396, 246, 411, 414
See application file for complete search history.

(56) References Cited

U.S. PATENT DOCUMENTS

| 4,691,274 | A | 9/1987 | Barrus |
| 6,285,090 | B1 * | 9/2001 | Brutsaert et al. ............... 290/55 |
| 6,671,585 | B2 * | 12/2003 | Lof et al. .................... 705/36 R |
| 7,024,805 | B2 * | 4/2006 | Onsager et al. ............... 37/396 |
| 7,227,273 | B2 * | 6/2007 | Ahmad et al. .............. 290/40 C |
| 7,307,399 | B2 * | 12/2007 | Furem .......................... 318/801 |
| 7,375,490 | B2 * | 5/2008 | Furem .......................... 318/801 |
| 7,385,372 | B2 * | 6/2008 | Ahmad et al. ............... 318/811 |
| 7,398,012 | B2 * | 7/2008 | Koellner ...................... 388/830 |
| 7,479,757 | B2 * | 1/2009 | Ahmad ......................... 318/811 |
| 7,504,784 | B2 * | 3/2009 | Asada et al. ................... 318/51 |
| 7,609,024 | B2 * | 10/2009 | Ahmad et al. ................ 318/811 |
| 7,622,884 | B2 * | 11/2009 | Furem .......................... 318/801 |
| 2005/0254801 | A1 * | 11/2005 | Koellner ...................... 388/830 |
| 2006/0087278 | A1 * | 4/2006 | Furem .......................... 318/778 |
| 2006/0097519 | A1 | 5/2006 | Steinke |

* cited by examiner

*Primary Examiner* — Antony M Paul

(57) ABSTRACT

Certain exemplary embodiments can provide a system, machine, device, manufacture, circuit, and/or user interface adapted for, and/or a method and/or machine-readable medium comprising machine-implementable instructions for, activities that can comprise, via a predetermined information device, for a predetermined excavating machine comprising a plurality of Active Front Ends, each Active Front End electrically coupled to an AC power supply network of said predetermined excavating machine, each Active Front End adapted to provide DC power to a DC bus, said DC bus electrically coupled to a plurality of inverters, each inverter adapted to supply AC power to at least one operating motor, independently controlling a reactive power produced by each Active Front End.

14 Claims, 14 Drawing Sheets

$pf_m := 0.8$ — POWER FACTOR IN MOTORING $pf_r := 0.98$ — POWER FACTOR IN REGENERATION $kw := -13, -12 .. 22$ — VARYING MOTOR LOAD OF THE MACHINE $pf(kw) := \left| \begin{array}{l} pf_m \text{ if } kw \geq 0 \\ pf_r \text{ if } kw < 0 \end{array} \right.$ — POWER FACTOR, AS IT CHANGES FROM MOTORING TO REGEN $kVA(kw) := \dfrac{kw}{pf(kw)}$ — kVA FOR GIVEN kw AND POWER FACTOR $kVAR(kw) := -kVA(kw) \cdot \sin(a\cos(pf(kw)))$ — kVARs REQUIRED TO PROVIDE SPECIFIED POWER FACTOR

FIG. 11

$$kw_{16}(kw) := \frac{kw}{3}$$

$$kw_{712}(kw) := \frac{kw}{3}$$

$$kw_{1318}(kw) := \frac{kw}{3}$$

$$kw_{16}(22) = 7.333$$

$$kw_{16}(-13) = -4.333$$

$$kVA_{16}(kw) := \frac{kw_{16}(kw)}{pf(kw)}$$

$$kVA_{712}(kw) := \frac{kw_{712}(kw)}{pf(kw)}$$

$$kVA_{1318}(kw) := \frac{kw_{1318}(kw)}{pf(kw)}$$

$$kVA_{16}(22) = 9.167$$

$$kVA_{16}(-13) = -4.422$$

$$kVAR_{16}(kw) := -kVA_{16}(kw) \cdot \sin(\mathrm{acos}(pf(kw)))$$

$$kVAR_{712}(kw) := -kVA_{712}(kw) \cdot \sin(\mathrm{acos}(pf(kw)))$$

$$kVAR_{1318}(kw) := -kVA_1$$

FIG. 12

$n_{16} := 4$     NUMBER OF ACTIVE AFEs ON DC BUS 1

$n_{712} := 4$     NUMBER OF ACTIVE AFEs ON DC BUS 2

$n_{1318} := 6$     NUMBER OF ACTIVE AFEs ON DC BUS 3

$n_{tot} := n_{16} + n_{712} + n_{1318}$     $n_{tot} = 14$     TOTAL NUMBER OF ACTIVE HD AFEs $kw_{16}(kw) := \dfrac{kw}{3}$     $kw_{712}(kw) := \dfrac{kw}{3}$     $kw_{1318}(kw) := \dfrac{kw}{3}$ $kw_{16}(22) = 7.333$     $kw_{712}(22) = 7.333$     $kw_{1318}(22) = 7.333$ $kVA_{16}(kw) := \dfrac{kw_{16}(kw)}{pf(kw)}$     $kVA_{712}(kw) := \dfrac{kw_{712}(kw)}{pf(kw)}$     $kVA_{1318}(kw) := \dfrac{kw_{1318}(kw)}{pf(kw)}$ $kVA_{16}(22) = 9.167$     $kVA_{712}(22) = 9.167$     $kVA_{1318}(22) = 9.167$ $kw_{16each}(kw) := \dfrac{kw \cdot \dfrac{6}{n_{16}}}{18}$     $kw_{712each}(kw) := \dfrac{kw \cdot \dfrac{6}{n_{712}}}{18}$     $kw_{1318each}(kw) := \dfrac{kw \cdot \dfrac{6}{n_{1318}}}{18}$ $kw_{16each}(22) = 1.833$     $kw_{712each}(22) = 1.833$     $kw_{1318each}(22) = 1.222$

FIG. 13

$$kVA_{16each}(kw) := \frac{kw_{16each}(kw)}{pf(kw)} \qquad kVA_{712each}(kw) := \frac{kw_{712each}(kw)}{pf(kw)} \qquad kVA_{1318each}(kw) := \frac{kw_{1318each}(kw)}{pf(kw)}$$

$$kVA_{16each}(22) = 2.292 \qquad kVA_{712each}(22) = 2.292 \qquad kVA_{1318each}(22) = 1.528$$

$$kVAR_{16}(kw) := -kVA_{16}(kw) \cdot \sin(\acos(pf(kw))) \cdot \frac{12}{n_{712}+n_{1318}} \cdot \frac{n_{16}}{6} \qquad kVAR_{16}(22) := -4.4$$

$$kVAR_{16each}(kw) := \frac{kVAR_{16}(kw)}{n_{16}} \qquad kVAR_{16each}(22) := -1.1$$

$$kVAR_{712}(kw) := -kVA_{712}(kw) \cdot \sin(\acos(pf(kw))) \cdot \frac{12}{n_{16}+n_{1318}} \cdot \frac{n_{712}}{6} \qquad kVAR_{712}(22) := -5.5$$

$$kVAR_{712each}(kw) := \frac{kVAR_{712}(kw)}{n_{712}} \qquad kVAR_{712each}(22) := -1.1$$

$$kVAR_{1318}(kw) := -kVA_{1318}(kw) \cdot \sin(\acos(pf(kw))) \cdot \frac{12}{n_{712}+n_{16}} \cdot \frac{n_{1318}}{6} \qquad kVAR_{1318}(22) := -5.5$$

$$kVAR_{1318each}(kw) := \frac{kVAR_{1318}(kw)}{n_{1318}} \qquad kVAR_{1318each}(22) := -1.375$$

FIG. 14

$$kVA_{16each}(kw) := \begin{cases} \sqrt{kw_{16each}(kw)^2 + kVAR_{16each}(kw)^2} & \text{if } kw \geq 0 \\ \left(\sqrt{kw_{16each}(kw)^2 + kVAR_{16each}(kw)^2} \cdot -1\right) & \text{if } kw < 0 \end{cases}$$

$kVA_{16each1}(22) = 2.138 \qquad kVA_{16each}(22) = 2.292$ $$kVA_{712each1}(kw) := \begin{cases} \sqrt{kw_{712each}(kw)^2 + kVAR_{712each}(kw)^2} & \text{if } kw \geq 0 \\ \left(\sqrt{kw_{712each}(kw)^2 + kVAR_{712each}(kw)^2} \cdot -1\right) & \text{if } kw < 0 \end{cases}$$

$kVA_{712each1}(22) = 2.138 \qquad kVA_{712each}(22) = 2.292$ $$kVA_{1318each1}(kw) := \begin{cases} \sqrt{kw_{1318each}(kw)^2 + kVAR_{1318each}(kw)^2} & \text{if } kw \geq 0 \\ \left(\sqrt{kw_{1318each}(kw)^2 + kVAR_{1318each}(kw)^2} \cdot -1\right) & \text{if } kw < 0 \end{cases}$$

$kVA_{1318each1}(22) = 1.84 \qquad kVA_{1318each}(22) = 1.528$

SYSTEMS, DEVICES, AND/OR METHODS FOR MANAGING DRIVE POWER

CROSS-REFERENCES TO RELATED APPLICATIONS

This application claims priority to, and incorporates by reference herein in its entirety, U.S. Provisional Patent Application 61/098,958, filed 22 Sep. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 10 is a listing of variables that can be used in an exemplary algorithm; and FIG. 11 is an exemplary power calculation;

FIG. 12 is an exemplary power calculation;

FIG. 13 is an exemplary power calculation; and

FIG. 14 is an exemplary power calculation.

DETAILED DESCRIPTION

Figure 1:
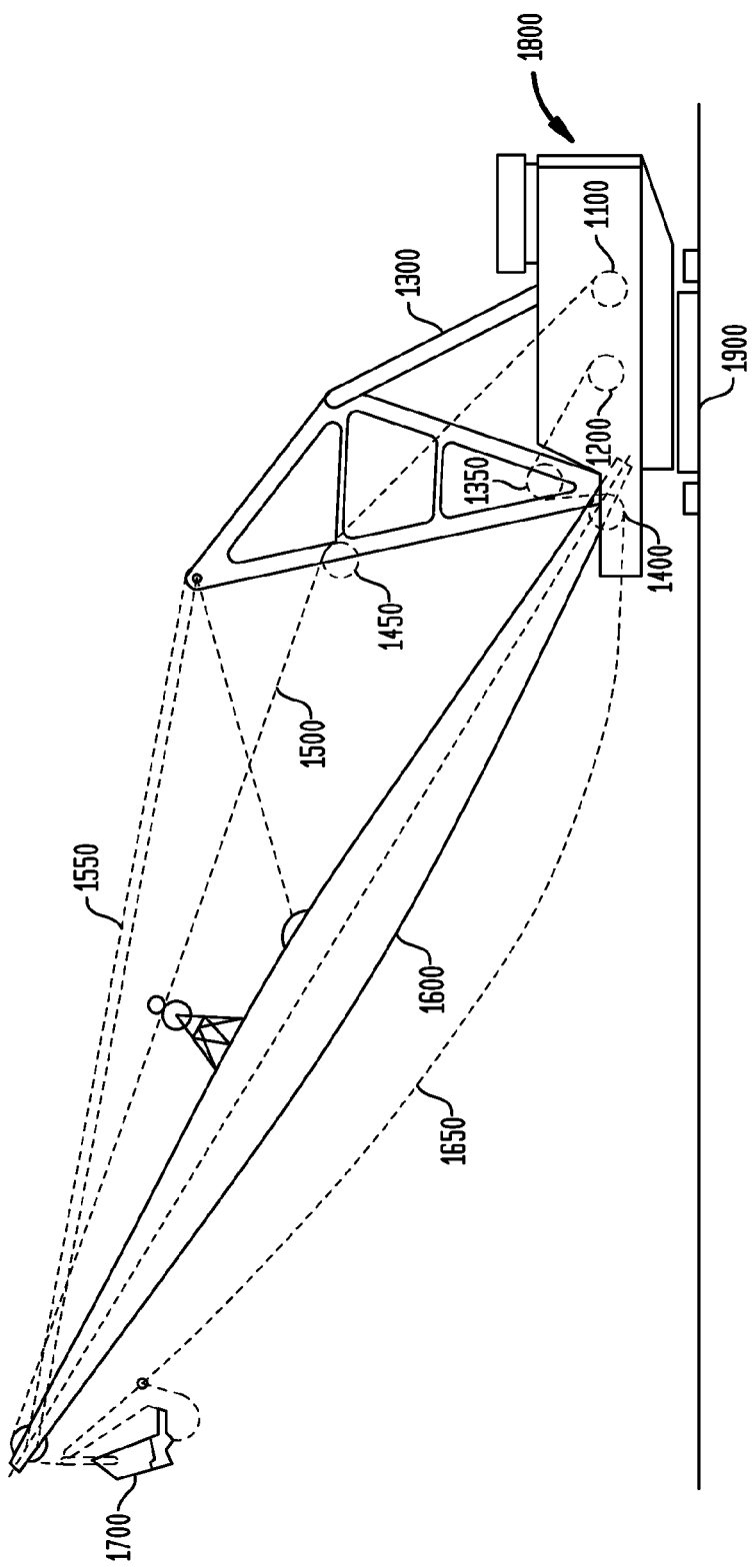
FIG. 1 is a side view of an exemplary embodiment of a machine.

Certain exemplary embodiments can comprise excavating machines used in mining operations such as the extraction of coal, iron, copper or other minerals or materials. Excavating machines can comprise dragline-mining machines, electric mining shovels, bucket wheel excavators, bore miners, and/or continuous miners, etc. An excavating machine can comprise a machine compartment providing platform supported for rotation. For certain machines, the machine compartment can comprise a boom supported by cables or lines, which can be held at an angle of inclination by pendants extending from the boom to a gantry mounted on top of the machine compartment. Certain machines can comprise a bucket, which can be suspended from the boom by hoist ropes wound on hoist drums in the machine compartment. In certain exemplary embodiments, the bucket can be dragged toward the dragline excavating machine by coordinated motion of hoist ropes and/or drag ropes. Hoist and/or drag ropes can be wound on drums comprised in the machine compartment. The machine compartment can comprise drive systems for driving, e.g., hoist motors, drag motors, walk motors, and/or "swing" motors. The motors can be adapted to control excavation, rotate the machine compartment and/or to move a particular excavating machine. Power to operate excavating machines can be obtained via alternating current (AC) utility power lines.

The hoist and drag drums in a dragline, however, can be very large, and/or can draw a significant amount of power from the utility lines when in use. Moreover, the inherent cyclical nature of the load requirements of draglines and other excavating machines can have a disturbing effect on the power system, such as the AC utility power system and/or the machine's internal power system. The drive systems for driving the hoist and drag drums, therefore, can be selected to provide sufficient power to drive the drums, and also can be selected to limit the effects on the AC utility power system, including harmonic distortion and power factor problems. Furthermore, to adequately provide excavation processes, the power system can be able to drive the drums at a very low speed.

Thus, the drag and hoist drums of typical dragline excavators can be operated by DC motors and/or associated motor-generator sets connected to the AC power line. The motor-generator sets each can include a large synchronous AC motor driving DC generators, and/or are typically arranged in Ward-Leonard loop configurations in which the large synchronous motors are capable of controlling power factor to minimize power system effects.

Because of the amount of force required to drive the drums, multiple drive motors can be needed for each drum. These motors can require a significant amount of space in the machinery house, and/or can require a significant amount of maintenance. To drive the drums at a sufficiently low speed, the DC drive motors can be coupled to the drums through very large gear trains extending, in some cases, over 25 feet. These large gear trains also can require a significant amount of space in the machinery housing, and/or can be difficult to align accurately.

AC drives also can be applied in mining excavator applications. These AC drives, can use SCR rectifiers, which can suffer from high harmonic distortion and/or relatively low power factor, which can have a significant detrimental effect on the AC utility power supply, and/or which can affect other devices using the utility power.

An exemplary AC drive system can include any number of Active Front Ends (AFE's), which can function as active IGBT rectifiers that can convert AC line input into a controlled DC-link voltage. This DC voltage then can be used as an input to IGBT inverters, which can provide a frequency controlled AC voltage to power, e.g., various AC motors of a mining machine's motions (e.g., hoist, crowd, drag, swing, propel, etc.).

The AC drive system can include any number of Active Front Ends (AFE's), which rectify AC input power and/or can provide frequency-modulated inverter control for controlling the hoist and drag motors. The active front ends can regulate the DC bus, control the power factor, and/or control total harmonic distortion at the dragline terminals. The AFE control algorithm can regulate unity, a lagging power factor, or a leading power factor to compensate for the effects of existing equipment at the point of common coupling. This feature can be used to minimize voltage fluctuations in the mine's power supply and/or distribution system, network, line, and/or grid. In addition, the high pulse rate of the AFEs, as seen by the AC power supply network, can result in a very low total harmonic distortion (THD)—typically less than 5%. These features can improve the power quality of the entire mine. Furthermore, each AFE's dynamic response to load changes can result in a system that is extremely robust against power grid disturbances.

An AFE can serve as a self-commutated (as opposed to line-commutated), pulsed rectifier and/or regenerative feedback unit that, in some embodiments, can comprise an inverter with IGBT modules and/or a Clean Power Filter. When utilized, the inverter can operate as an intelligent converter. Each AFE can generate a nearly perfectly sinusoidal current and/or voltage output, and/or the resulting active power from an AFE typically range from 37 kW to 1200 kW, and can range to 6000 kW.

An AFE can regenerate AC power back into the AC power supply, which can be particularly useful for weak AC power networks. As a result of an active shutdown, even in regenerative operation, commutation faults and/or associated fuse failures need not occur. The self-commutated drive converter, which can be clocked at, e.g., 3 kHz, can switch the current independent of the AC power supply. Operation can be maintained during brief supply interruptions in the millisecond range.

An AFE can operate as step-up controller with a DC link voltage that lies above the peak AC supply voltage. For AC supplies with significant voltage fluctuations, the DC link voltage level, which can be parameterized, can be kept constant. Voltage fluctuations down to 65% of the AC supply voltage can be compensated. If the voltage falls below the limit, the AFE can be shutdown in a controlled fashion. For special applications, if appropriately engineered, even higher voltage fluctuations can be tolerated.

When the load changes from −100% to −100% torque (or vice versa), for an AFE, only extremely short delay times typically occur. The delay time at the drive shaft can be exclusively defined by the inverter, which can be connected between the DC link and the motor powering the drive shaft.

The power factor generated by the AFE, i.e., the phase position between the AC supply current and voltage, can be selected depending on the particular application, and typically can range between 0.8 and 1.0 (capacitive or inductive). The power factor setting can be directly parameterized and/or dynamically set via, e.g., a fieldbus-connected controller and/or a remote access system, such as the Siemens SIRAS remote access system, such that it can be automatically controlled to the selected value. Note that SIRAS also can use Internet-enabled remote diagnostics to allow service technicians and/or other experts to log on from around the world and/or do the same work as the electrician on board of the excavating machine with the exception of tightening a screw.

The reactive power generated by the AFE can be controlled to a set value, parameterized, and/or dynamically adjusted as described above, and/or the reactive current can be independent of the motor output.

The AFE's and/or inverters can utilize power switching devices such as IGBT (insulated gate bipolar transistor) or IGCT (integrated gate commutated transistors) or IEGT (injection enhanced gate transistor) technology. In the rectifier of the AFE, this technology can allow control of power factors appropriately for use in the excavating machine while generating a relatively low level of harmonics. In the inverter, this technology can provide a variable voltage/variable frequency source to power and/or control motors efficiently and/or at very low speeds with significant resolution.

IGBTs can be an ideal switch for controlling the AFE's and/or inverters. IGBT features can include high switching frequencies, which can improve the current quality to the motors, a lack of snubbers and/or smaller, less complex gate drivers, and/or high overload capacity, which can enable electronic protection circuits without fuses.

Thus, a typical AFE can comprise an IGBT drive converter with gating unit, a Clean Power Filter, a pre-charging contactor, and/or a main contactor. An AFE can be constructed modularly, and can be mounted in a standard control cabinet that be ideally suited for harsh mining environments. The cabinet can be constructed as a single unit, making it very strong and capable of withstanding heavy shock and vibration. The cabinet can utilize a water cooled design that require no external air, which can allow the cabinet to be sealed, keeping components protected from the harsh environment.

Via an information device, such as a programmable logic controller and/or a Siemens SIBAS modular control system, a closed loop control can be used to regulate the output voltage VDC of each of the AFE units by maintaining the balance of active power through the circuit using feedback loops to control the active current and/or the reactive current. A vector modulator can used to generate firing pulses for the power transistors in the AFE unit. As a result of this control, the AFE unit can control the power factor without additional capacitors or passive filters. The AFE can be designed to operate with power factor PF=1. If required, a leading power factor of up to 0.8 leading can be adjusted. The control of the AFE rectification and/or inverter circuits can be provided by a central controller which can provide firing signals for any and/or all of the power switching circuits and/or which can be tied through communications links to various other operating stations in the machine to provide maintenance and/or other functions.

Variables associated with the drive system can be monitored and/or collected by a real time performance monitoring and/or data collection system, such as the Siemens MIDAS system, which can harvest a wealth of data during normal operation and makes it available for productivity and/or maintenance analysis and/or optimization, such as via an intuitive graphical user interface, data visualizer, and/or report generator.

The drive systems for driving hoist, drag motors, walk motors, and/or "swing" motors can include one or more inverter devices, which can include one or more AFE rectifier and/or inverter circuits, potentially providing one AFE rectifier and one inverter circuit for each motor. The inverter devices can receive power through a transformer, and/or can convert the power to a voltage and/or frequency controlled signal to drive the motors.

During motoring, the inverters can take power from the DC link to drive the motors of the excavating machine. During regenerative braking, the inverters can send power from the motors back to the DC link. The common DC link can enable the exchange of energy between motoring and regenerating drives.

The drive system can generate a Pulse Wave Modulated (PWM) DC voltage having a duty cycle ("on time") that can be continuously varied to affect the time-averaged voltage output. The variable DC voltage can power and/or, via varying the duty cycle, control a speed of, one or more of the DC motors, such as a hoist motor, a swing motor, a drag motor, and/or a propel motor, etc.

FIG. 1 is a side view of an exemplary embodiment of a machine 1000, which can comprise a machine compartment 1800. Machine 1000 can comprise a boom 1600 projecting upwardly from the lower front of machine compartment 1800. Boom 1600 can be held at an angle of inclination by means of pendants 1550 extending from boom 1600 to a gantry 1300, which can be mounted on top of machine compartment 1800. A bucket 1700 can be suspended by hoist ropes 1500 which can pass over a sheave 1450 and wind on a hoist drum 1100. Bucket 1700 can be dragged toward the dragline excavating machine 1000 by drag ropes 1650, which can pass over fairleads 1350 near boom foot pins 1400 and onto drag drums 1200. Machine 1000 can be mounted on a walking shoe or walking mechanism 1900, which can allow the dragline excavating machine to be moved from place to place.

Figure 2:
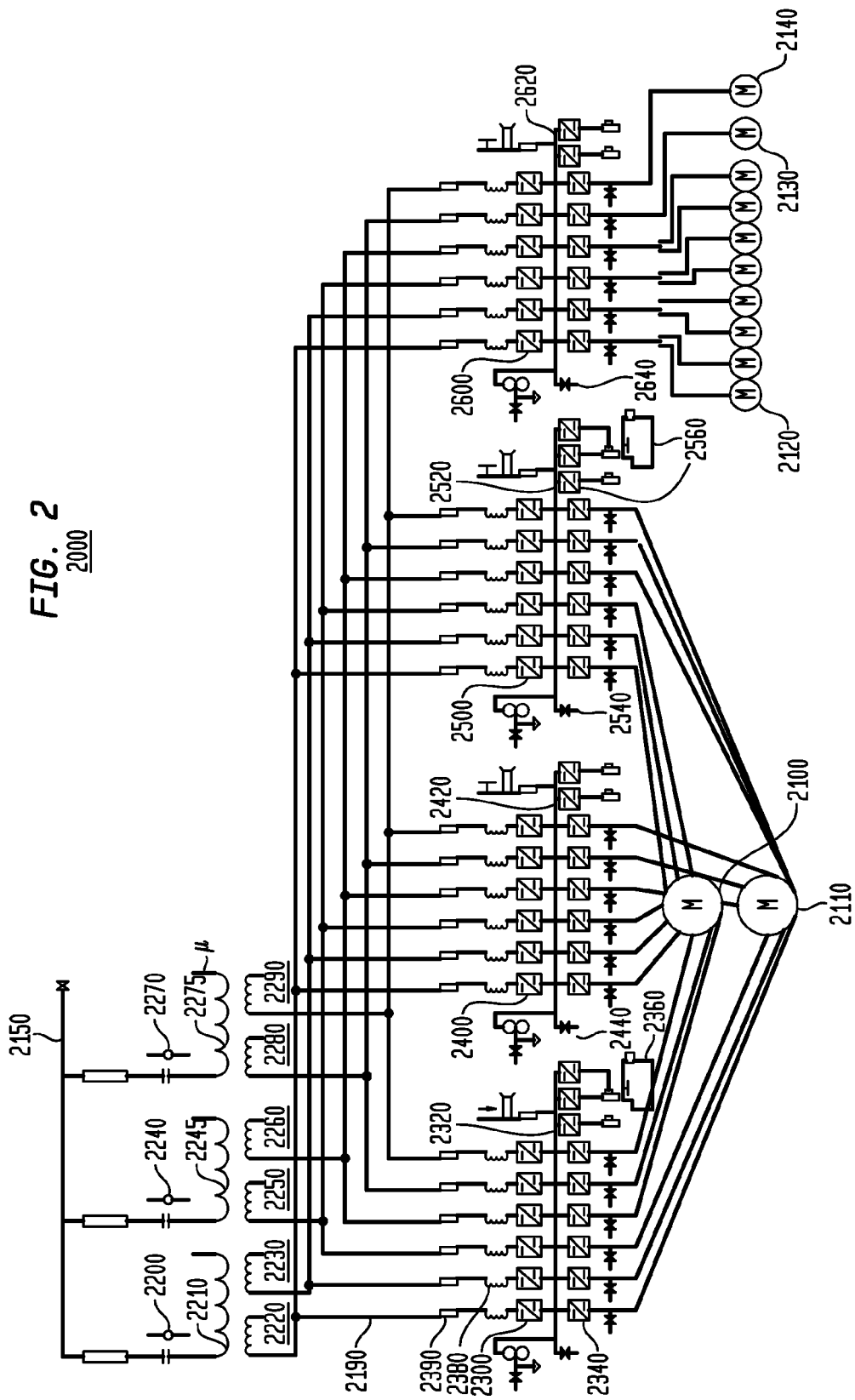
FIG. 2 is a block diagram of an exemplary embodiment of a machine electrical system.

FIG. 2 is a block diagram of an exemplary embodiment of a machine electrical system 2000, which can comprise a synchronous hoist motor 2100 and/or a synchronous drag motor 2110. In certain exemplary embodiments, hoist motor 2100 and/or drag motor 2110 can comprise a plurality of winding segments. A powered circuit can be adapted to operate each of hoist motor 2100 and drag motor 2110 to provide motion for certain pieces of machinery. For example, Hoist motor 2100 can be adapted to provide motive force to a hoist, such as by turning hoist drum 1100 of FIG. 1. Drag motor 2110 can be adapted to provide motive force for a drag motion such as by providing power to drag drum 1200 of FIG. 1. Field exciters, such as field exciter 2360 and field exciter 2560, can be adapted to start rotation of each of hoist motor 2100 and hoist motor 2110.

System 2000 can comprise and/or be coupled to a source 1100 of AC power, which can range in voltage from approximately 110 volts AC to approximately 60,000 volts AC, including all values and sub-ranges therebetween, such as, for example, approximately 3000, 6000, 7500, and/or 9000 volts, etc. The AC power can be coupled to a transformer 1200, that can change the voltage to a desired value and/or range, such as for example, approximately 240, 450, 600, 900, and/or 1200 volts, etc. The resulting AC power can be provided to an Active Front End unit (AFE), which can comprise one or more active IGBT rectifiers, any of which can comprise an input reactor, 6 IGBT transistors and anti parallel diodes in a 6-pulse bridge configuration, low inductance bus connections, a firing circuit to turn on/off the IGBTs, current and voltage transducers, and/or a digital control circuit, etc. An Active Front End unit can receive the AC voltage and output a substantially constant DC voltage.

Certain exemplary embodiments can comprise a plurality of non-operating asynchronous three phase motors 2120, each of which can comprise a single winding segment. System 2000 can comprise a plurality of operating asynchronous three phase motors 2130, 2140. Motors 2120, 2130, 2140 can be cycled on and off according to needs based upon machine motion and digging cycles. For example, plurality of asynchronous motors 2120, 2130, 2140 can be adapted to provide motive force to transversely move a machine, such as by driving walking mechanism 1900 of machine 1000 of FIG. 1. Asynchronous motors 2120, 2130, 2140 can be adapted to provide motive force to devices adapted to provide a swinging motion to a boom, such as boom 1600 of machine 1000 of FIG. 1.

To provide power to motors, such as hoist motor 2100 and/or drag motor 2110, a plurality of inductors 2380 can step up an AC voltage supplied via a primary AC bus 2150 and a plurality of secondary AC buses 2190 via a plurality of transformers 2200, 2240, 2270. An alternating current associated with the AC voltage can be measured at a plurality of current transformers 2390, which can be adapted to measure total, active, and/or reactive current values. Each of transformers 2200, 2240, 2270 can comprise a respective set of primary windings 2210, 2245, 2275. Transformer 2200 can comprise secondary windings 2220, 2230. Transformer 2240 can comprise secondary windings 2250, 2260. Transformer 2270 can comprise secondary windings 2280, 2290. Each of secondary windings 2220, 2230, 2250, 2260, 2280, 2290 can be electrically coupled to a plurality of DC buses 2320, 2420, 2520, 2620. An AC voltage provided via transformers 2200, 2240, 2270 can be managed and/or rectified by a plurality of Active Front End units 2300, 2400, 2500, 2600 to provide one or more predetermined DC voltages to respective DC buses 2320, 2420, 2520, 2620.

In certain exemplary embodiments, for a particular DC bus such as DC bus 2320, each of plurality of electrically coupled Active Front End units 2300 can receive an AC voltage from a predetermined distinct secondary winding comprised in plurality of transformers 2200, 2240, 2270. Receiving the AC voltage from predetermined distinct secondary windings can retard a direct current associated with DC bus 2320 from flowing to transformers 2200, 2240, 2270 as the AC voltage cycles below the DC voltage of DC bus 2320.

When measurements associated with any of plurality of DC buses 2320, 2420, 2520, 2620 are determined not to be within respective predetermined ranges, one or more corresponding Active Front End units 2300, 2400, 2500, 2600 can apply a voltage to at least one of DC buses 2320, 2420, 2520, 2620 and/or can remove power from at least one of DC buses 2320, 2420, 2520, 2620. For example, when electric motors 2100, 2110, 2120, 2130, 2140 operate to generate electrical power, Active Front End units can act to feed AC power to AC bus 2150 via transformers 2200, 2240, 2270.

DC buses 2320, 2420, 2520, 2620 can be electrically coupled to a DC chopper. For example DC chopper 2560 can be electrically coupled to DC bus 2500. DC chopper 2560 can be adapted to reduce a DC voltage associated DC bus 2500 responsive to a determination that the DC voltage exceeds a predetermined threshold.

Active Front End unit switching can take place at a rate to regulate DC voltage values associated with DC buses 2320, 2420, 2520, 2620. Each of plurality of Active Front End units 2300, 2400, 2500, 2600 can switch on and off at a predetermined frequency and/or variable duty cycle, either of which can be based upon the voltage and/or current values and/or waveforms associated with AC bus 2150 and/or DC buses 2320, 2420, 2520. In certain exemplary embodiments, the predetermined frequency and/or variable duty cycle can be based upon a programmed need for line VARs. In certain exemplary embodiments, predetermined frequency and variable duty cycle can be based upon a number of Active Front End units and a load from devices electrically comprised in and/or coupled to system 2000. Plurality of Active Front End units 2300, 2400, 2500, 2600 can be adapted to provide a relatively quick response to load changes in system 2000. In certain exemplary embodiments, plurality of Active Front End units 2300, 2400, 2500, 2600 can respond to a load change in system 2000 at a rate of 7.5 times a line frequency associated with AC bus 2150. For example, for a line frequency of 60 Hz, plurality of Active Front End units 2300, 2400, 2500, 2600 can respond to a load change in system 2000 in $1/450^{th}$ of a second.

Each of plurality of Active Front End units 2300, 2400, 2500, 2600 can be adapted to convert an AC voltage to a DC voltage at a fixed voltage level. The DC voltage transferred to DC buses 2320, 2420, 2520, 2620 can be converted to a variable AC frequency via a plurality of inverters 2340, 2440, 2540, 2640. The variable AC frequency can be adapted to drive AC motors and to vary the speed and/or the torque of AC motors. Such inverters can be adapted to provide AC signals at a frequency of approximately 29.9, Hz, 40 Hz, 48.75 Hz, 54.2 Hz, 60 Hz, 69.2 Hz, 77.32 Hz, 85.9 Hz, 99.65 Hz, 120 Hz, 144.2 Hz, 165.54 Hz, 190.3, 240 Hz and/or any value or sub-range of values therebetween.

Harmonic distortion associated with AC bus 2150 can be managed and/or resisted via utilization of a plurality of Active Front End units for each DC bus. Plurality of Active Front End units 2300, 2400, 2500, 2600 electrically coupled to distinct predetermined transformer windings, such as secondary windings 2220, 2240, 2270, can isolate AC bus 2150 from feedback associated with switching plurality of Active Front End units 2300, 2400, 2500, 2600. Certain exemplary embodiments can comprise a "minimal factor" of Active Front End units. For example, in system 2000, eighteen Active Front End units can be associated with hoist motor 2100 and drag motor 2110.

Managing and/or resisting harmonic distortion can result in less heat emitted from transformers 2200, 2240, 2270, a larger K factor for transformers 2200, 2240, 2270, and/or fewer transformers 2200, 2240, 2270 for certain mining machines. In certain exemplary embodiments, transformer sizes can be increased as compared to systems comprising only a single Active Front End unit electrically coupled to each DC bus.

In certain exemplary embodiments, a plurality of inverters 2340, 2440, 2540, 2640 can be electrically coupled to respective DC buses 2320, 2420, 2520, 2620. Each plurality of inverters 2340, 2440, 2540, 2640 can receive a DC voltage and convert the DC voltage to an AC voltage with a predetermined and/or selectably variable frequency.

Synchronous motors, such as hoist motor 2100 and drag motor 2110, can be three phase motors and can comprise 3 segments per winding. Asynchronous motors, such as plurality of asynchronous motors 2120, 2130, 2140, can be three phase motors and can comprise one segment per winding. Asynchronous motors 2120, 2130, 2140 can be adapted to receive an alternating current comprising a variable frequency and variable voltage.

Figure 3:
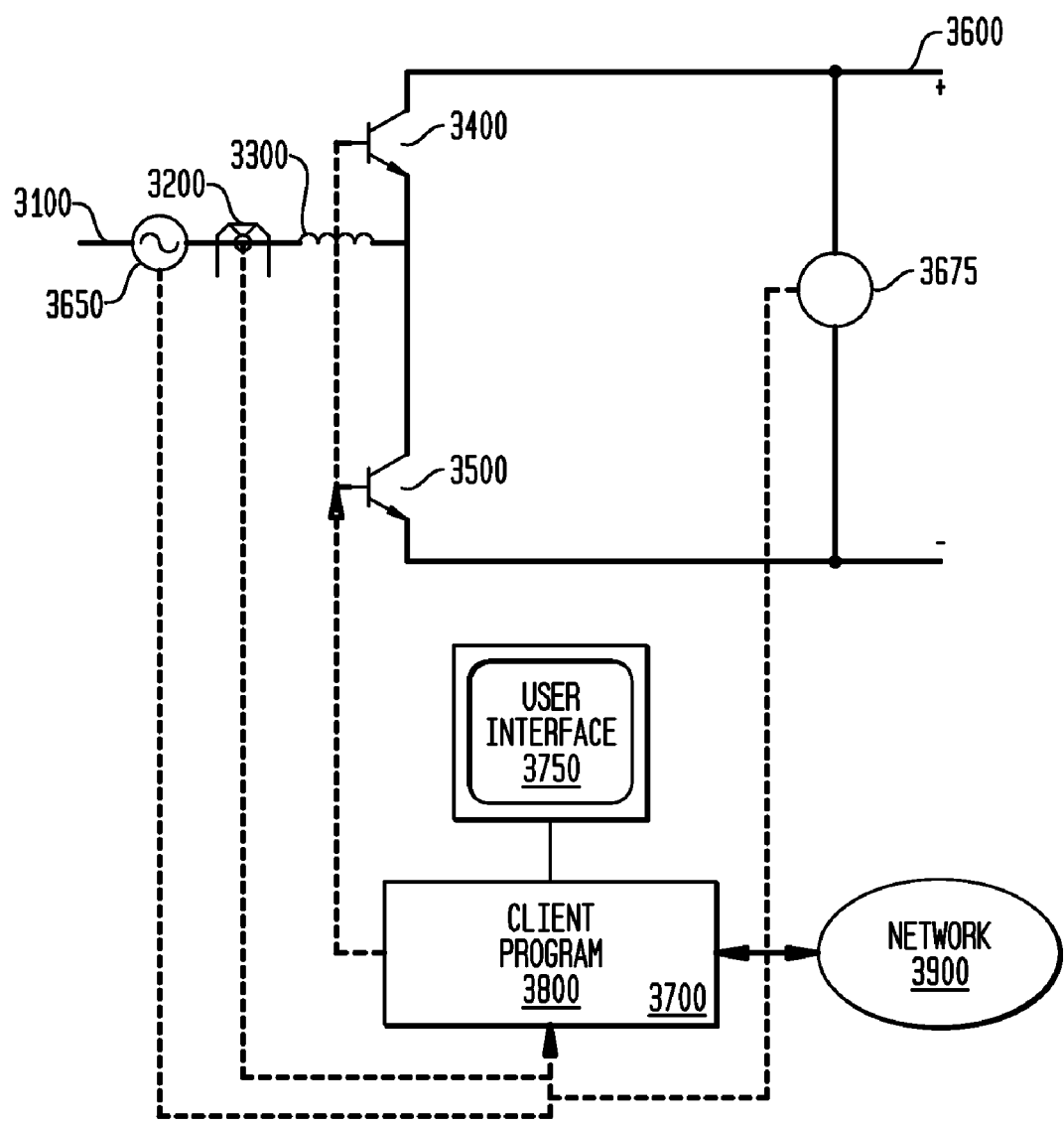
FIG. 3 is a schematic diagram of an exemplary embodiment of an system.

FIG. 3 is a schematic diagram of an exemplary embodiment of an system 3000, which can comprise a source of alternating current 3100. A voltage sensor 3650 can be adapted to measure an AC voltage of alternating current 3100, such as on an AC bus, on a primary side of a voltage transformer, and/or on a secondary side of the voltage transformer. Alternating current flowing from source of alternating current 3100 can be measured via a current transformer 3200, which can be located on a primary side of a voltage transformer and/or on a secondary side of the voltage transformer. System 3000 can comprise an inductor 3300, which can be adapted to step up an AC voltage fed to transistors 3400, 3500, which can be power switching devices such as IGBT (insulated gate bipolar transistor), IGCT (integrated gate commutated transistors), and/or IEGT (injection enhanced gate transistor) technology, etc.

Transistors 3400, 3500 can be adapted to rectify an AC voltage to provide a DC voltage to a DC bus 3600. A sensor 3675 can be adapted to measure a value of a variable, such as a voltage or a current associated with DC bus 3600. Current transformer 3200, voltage sensor 3650, and/or sensor 3675 can be communicatively coupled to an information device 3700. Information device 3700 can be adapted to switch transistors 3400, 3500 responsive to signals from current transformer 3200 voltage sensor 3650, and/or sensor 3675. For example, transistors 3400, 3500 can be switched on responsive to a voltage value detected by sensor 3675 being below a predetermined threshold. Information device 3700 can change a duty cycle of transistors 3400, 3500 responsive to a provided, obtained, calculated, and/or determined total, active, and/or a reactive current value, a voltage value, such as a voltage measured by voltage sensor 3650, and/or an electrical value, such as a voltage and/or a current measured by sensor 3675.

Figure 4:
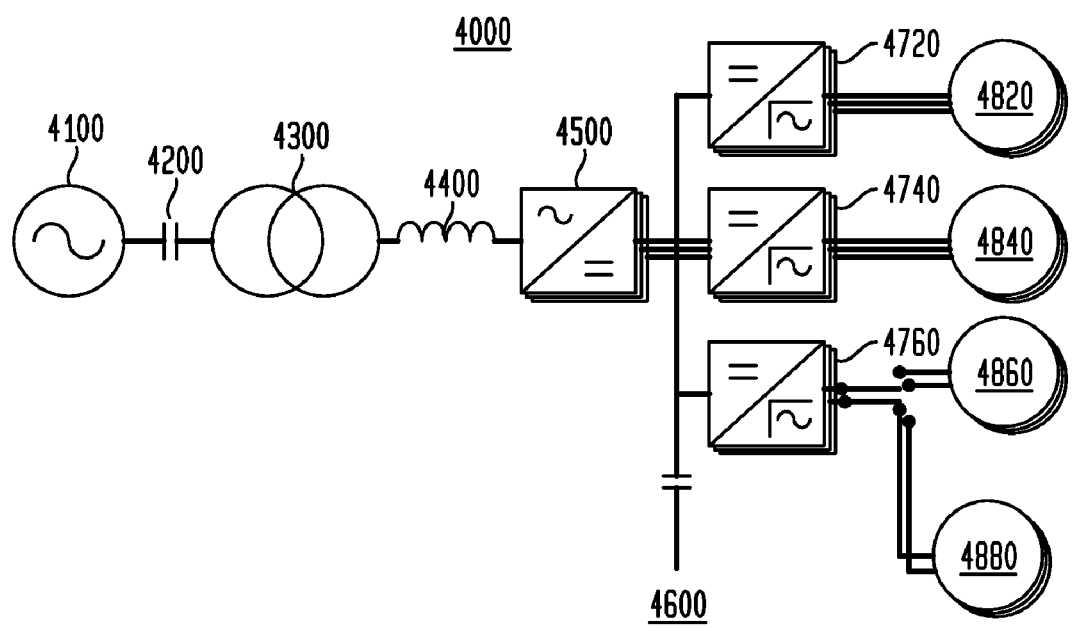
FIG. 4 is a block diagram of an exemplary embodiment of a machine electrical system.

FIG. 4 is a block diagram of an exemplary embodiment of an system 4000, which can comprise an AC power supply, network, grid, and/or line, etc. 4100, such as a mine AC power supply. The incoming AC supply voltage can be fed through main contactor 4200 to the drive power transformer 4300. The secondary voltage (e.g., 900 VAC) from the drive power transformer 4300 can be fed through a reactor 4400 to any number of AFEs 4500. The AFEs 4500 can convert the AC voltage to 1800 VDC and provide it to the DC bus or link 4600 (which can include any desired number of capacitors). DC link 4600 can provide a steady DC supply for any number of inverters 4720, 4740, 4760, which can convert the constant DC voltage to a variable frequency, variable voltage AC (e.g., (0-1400V3AC) for any number of hoist motors 4820, drag motors 4840, swing motors 4860, and/or propel (or walk) motors 4880, etc. This modular design can be paralleled to energize machines with different power requirements. The same basic structure and power electronics can be used to control traditional induction motors for geared applications, as well as synchronous motors for gearless applications.

Figure 5:
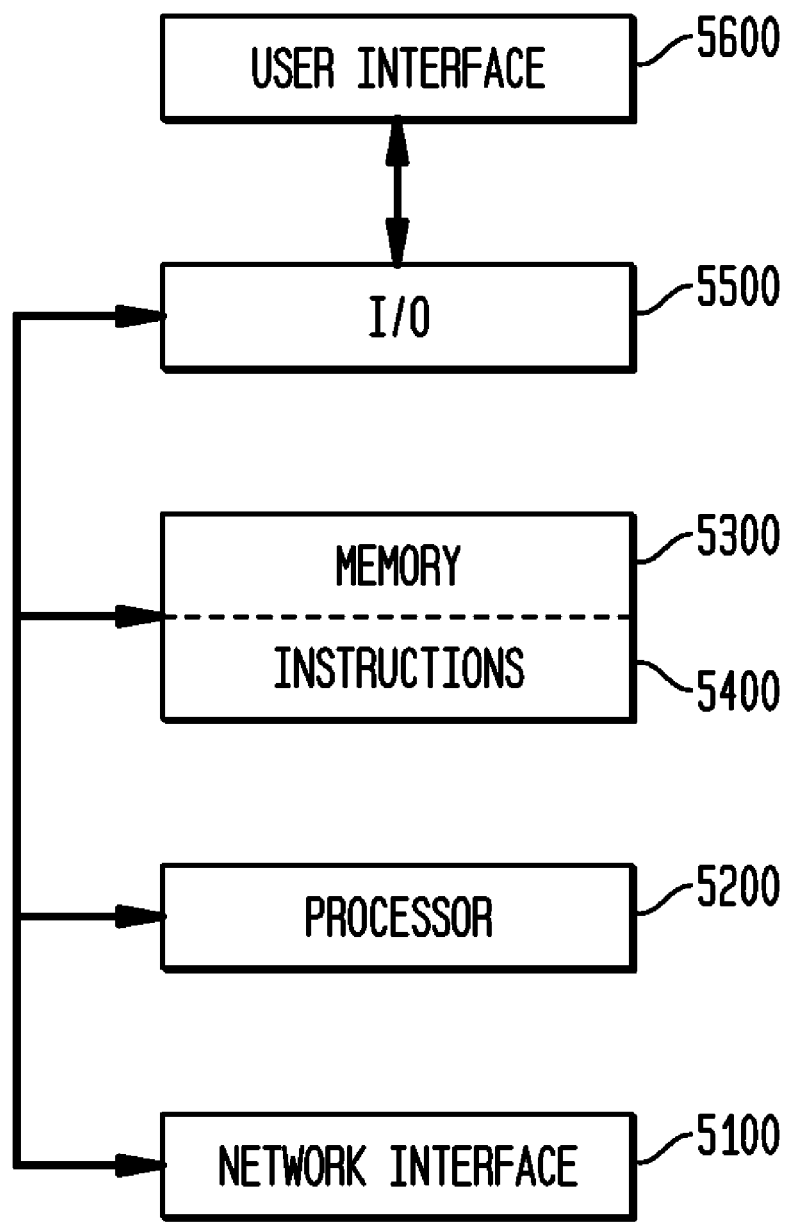
FIG. 5 is a block diagram of an exemplary embodiment of an information device.
Figure 7:
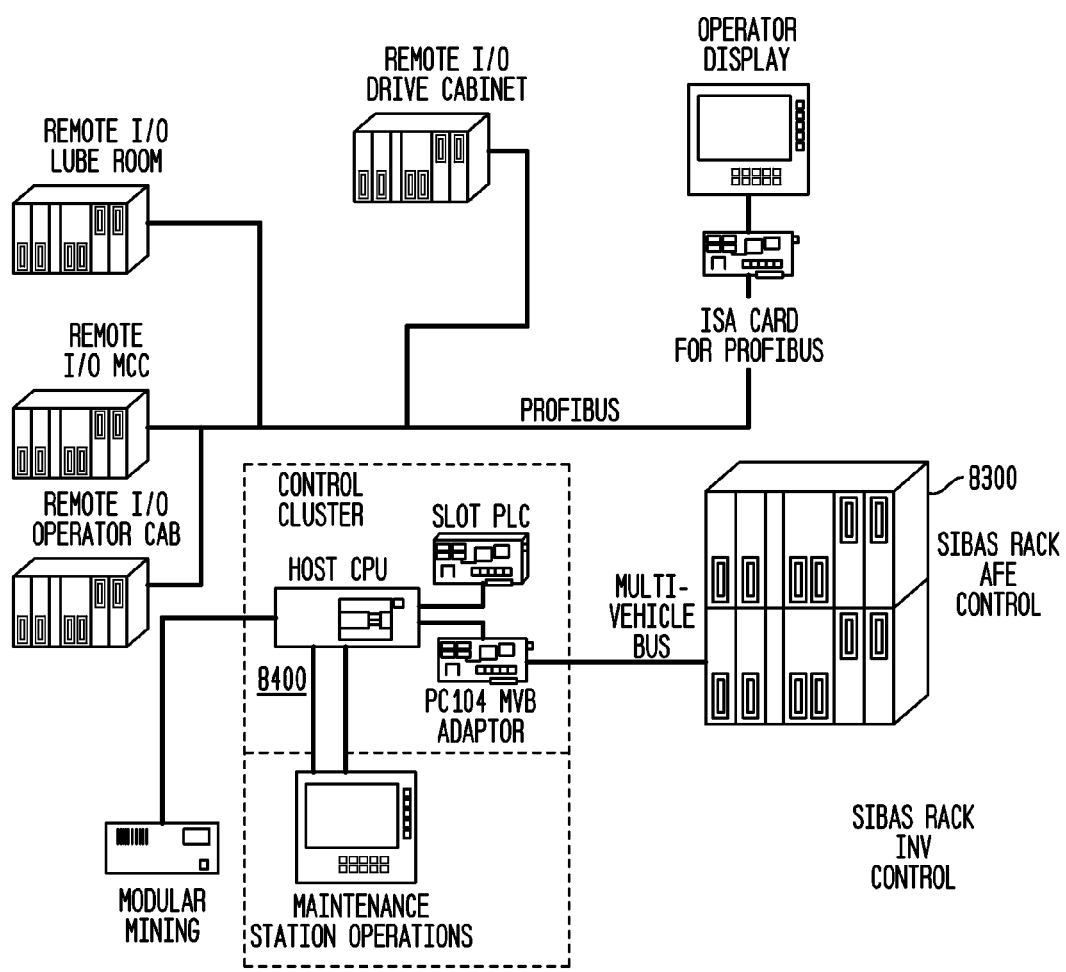
FIG. 7 is a block diagram of an exemplary embodiment of a control and communication network.

FIG. 5 is a block diagram of an exemplary embodiment of an information device 5000, which in certain operative embodiments can comprise, for example, information device 3700 of FIG. 3 and/or central controller 8300 and/or 8400 of FIGS. 7 and/or 8. Information device 5000 can comprise any of numerous components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

In certain exemplary embodiments, via one or more user interfaces 5600, such as a graphical user interface, a user can view a rendering of information related to controlling, managing, and/or switching a plurality of Active Front End units electrically coupled to a DC bus and/or an AC power supply.

Figure 6:
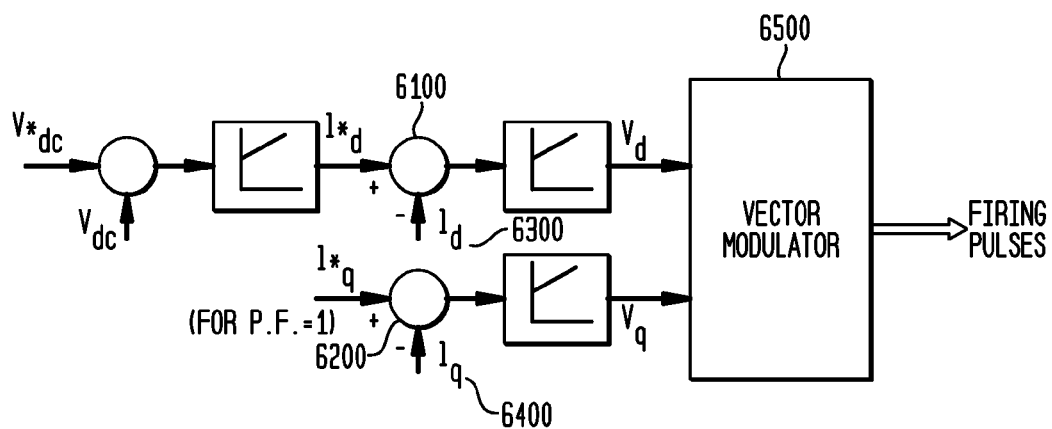
FIG. 6 is a block diagram of an exemplary embodiment of a control circuit.

Referring now to FIG. 6, a closed loop control can be used to regulate the output voltage VDC of each of the AFE circuits 6000 by maintaining the balance of active power through the circuit using feedback loops 6100 and/or 6200 to control the active current I d 6300 and/or the reactive current I q 6400. A vector modulator 6500 can be used to generate the firing pulses for the power transistors in the AFE circuit 6000. As a result of this control, the AFE circuit 6000 can control the power factor without additional capacitors or passive filters.

Figure 8:
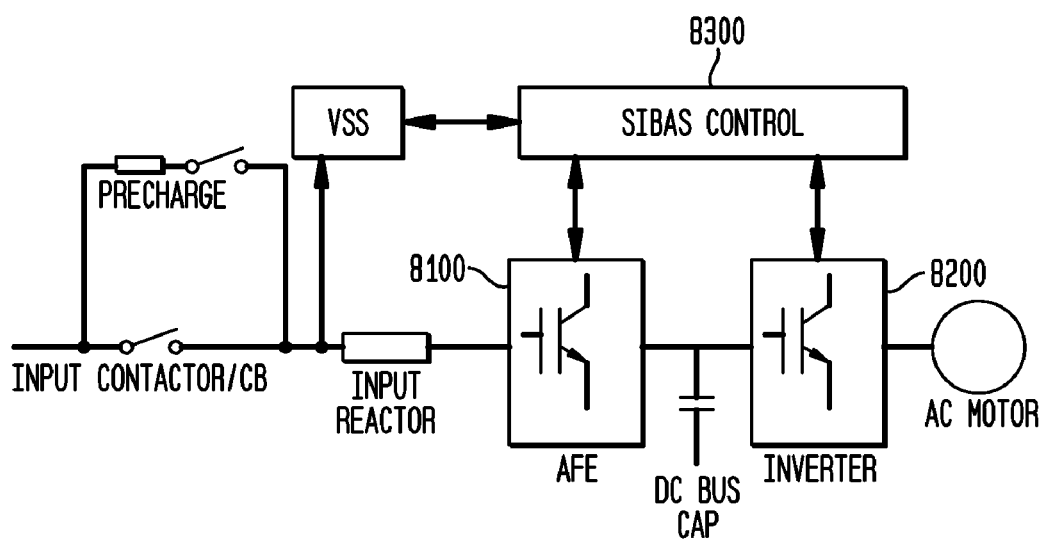
FIG. 8 is a block diagram of an exemplary embodiment of a circuits as controlled.

Referring now to FIGS. 7 and 8, control of the AFE circuits 8100 and/or the inverter circuits 8200 can be provided by a central controller 8300 and/or 8400 which can provide firing signals for all of the IGBT circuits and/or can also be tied through communications links to various other operating stations in the machine to provide maintenance and/or other functions. Although one or more variable speed drives can be built specifically for the application, suitable variable speed AC drives can be commercially obtained from, for instance, Siemens AG of Erlangen Germany, sold under trade names such as Simovert® Masterdrives, Simovert® ML, Transvektor® controls, and/or other brand names. Although commercially available, typically, these drives are built and sized for a specific application.

Figure 9:
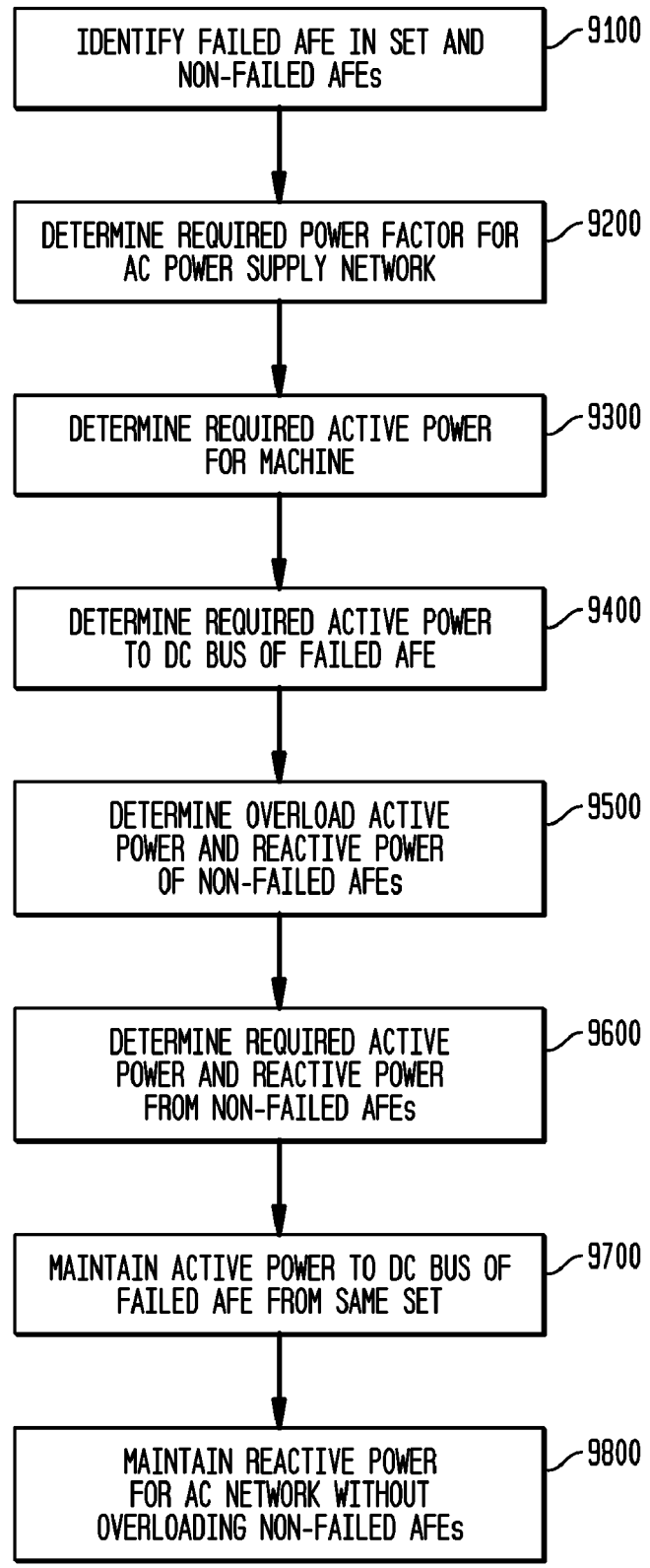
FIG. 9 is a flowchart of an exemplary embodiment of a method.

FIG. 9 is a flowchart of an exemplary embodiment of a method 9000, which can be performed via a predetermined information device, such as information device 3700 of FIG. 3 and/or central controller 8300 and/or 8400 of FIGS. 7 and/or 8. At activity 9100, a failed (and/or deselected) AFE in one of a plurality of sets of AFEs can be identified. The non-failed (and/or selected) AFEs also can be identified. At activity 9200, a required power factor for an AC power supply network can be identified and/or determined. At activity 9300, a required active power for an excavating machine, and/or any one or more DC buses and/or motors thereof, can be determined. At activity 9400, a required active power for the DC bus associated with the failed (and/or deselected) AFE can be determined. At activity 9500, an active power and/or reactive power that will overload one or more non-failed (and/or selected) AFEs can be determined. At activity 9600, an active power and/or reactive power required from one or more of the non-failed (and/or selected) AFEs can be determined. At activity 9700, the active power provided to the DC bus of the failed (and/or deselected) AFE prior to the failure of the AFE can be maintained to that DC bus, such as via the non-failed (and/or selected) AFEs serving that DC bus. At activity 9800, the reactive power provided to the AC power supply network prior to the failure of the AFE can be maintained to the AC power supply network via one or more of the non-failed (and/or selected) AFEs, which potentially can include non-failed (and/or selected) AFEs serving a DC bus other than the DC bus associated with the failed (and/or deselected) AFEs.

As generally shown in FIGS. 10-14, certain exemplary embodiments can provide one or more exemplary algorithms that can be used to prevent and/or compensate for voltage drops, regulate reactive power, and/or maintain power factor.

FIG. 10 identifies and/or defines exemplary variables that can be used in one or more exemplary algorithms.

An information device, controller, and/or processor can determine the required active power, reactive power, and/or apparent or total power for each of the non-failed AFE units and/or sets of non-failed AFE units of the machine. Based on one or more of these determined values, the appropriate reactive power for each of the non-failed AFEs can be generated to produce the required power factor.

For example, as shown in FIG. 11, prior to failure of any AFEs, the total power required from AFE sets 1-6, 7-12, and 13-18 can be determined at each of the expected loads (e.g., 22 kw and −13 kw). The apparent power (kVA), which is the vector sum of the real or active power (kw) and the reactive power (kVAR), for each of the AFE sets can be determined by dividing the active power by the known power factor for the AC supply, which can depend on whether the motors are motoring or regenerating. Then, applying the definition shown in FIG. 10, the reactive power (kVARs) for each of the AFE sets can be determined.

As shown in the calculations of FIGS. 12, 13, and 14, when at least one AFE has failed, since the power requirement typically remains the same for all DC links, there can be a need for the remaining non-failed AFEs to produce more power. Yet if the reactive power reference was held constant for all the DC links, then the AFEs might reach their power limit. Therefore, the non-failed AFE sets can produce more reactive power to compensate for the diminished reactive power capacity of the AFE set containing the failed AFE. Thus, the required active power from each AFE in the set containing the failed AFE can be re-calculated. Likewise, the required reactive power from each AFE in the set containing the failed AFE, and/or one or more sets not containing the failed AFE, can be re-calculated. These calculations can be based on the desired power factor, which can be measured at the machine's power terminals, and/or which can correspond to the mode of the motors.

The information device can give a proportional share of the reactive power to each AFE unit and/or set. Even if an AFE is deselected, the same active power can be delivered to each DC link. Since the active power requirement can remain the same for all DC links, if an AFE is deselected, the remaining AFEs will have to produce more active power to meet the demand. If the reactive power reference is kept the same for all DC links, then the AFE units can reach their apparent power limit. Therefore, the following control can be used to have the other DC links produce more reactive power to compensate.

Via this control scheme, the apparent power (kVA) over each DC link can remain equal and/or balanced no matter how many AFEs are deselected, yet an individual AFE's active power (kw) can go up as AFEs are deselected. Larger active power and more apparent power can put the AFE unit and/or set near its limits, but by reducing the reactive power reference based on the number of AFEs selected, those limits can be avoided.

Certain exemplary embodiments can provide a system, machine, device, manufacture, circuit, and/or user interface adapted for, and/or a method and/or machine-readable medium comprising machine-implementable instructions for, activities that can comprise, via a predetermined information device:

for a predetermined excavating machine comprising a plurality of Active Front Ends, each Active Front End electrically coupled to an AC power supply network of said predetermined excavating machine, each Active Front End adapted to provide DC power to a DC bus, said DC bus electrically coupled to a plurality of inverters, each inverter adapted to supply AC power to at least one operating motor:

for a predetermined excavating machine comprising a plurality of sets of Active Front Ends, each set of Active Front Ends electrically coupled to an AC power supply network of said predetermined excavating machine, each set of Active Front Ends adapted to provide a required DC bus power to a predetermined DC bus from a plurality of DC buses, each DC bus from said plurality of DC buses electrically coupled to a plurality of inverters, each inverter adapted to supply AC power to a plurality of operating motors, responsive to identifying a failed Adaptive Front End from a first set of Active Front Ends: and/or via a predetermined information device, for a predetermined excavating machine comprising a plurality of sets of Active Front Ends, each set of Active Front Ends electrically coupled to an AC power supply network of said predetermined excavating machine, each set of Active Front Ends adapted to provide a corresponding required DC bus power to a corresponding DC bus from a plurality of DC buses, each DC bus from said plurality of DC buses electrically coupled to a plurality of inverters, each inverter adapted to supply AC power to a plurality of operating motors:

independently controlling a reactive power produced by each Active Front End;

causing provision of said required DC bus power to be maintained while adaptively controlling a reactive power produced by each non-failed Active Front End from said first set of Active Front Ends to maintain a predetermined power factor for said AC power supply network;

responsive to identifying a failed Adaptive Front End from a first set of Active Front Ends serving a first DC bus from said plurality of DC buses, causing provision of a corresponding required DC bus power to said first DC bus to be maintained while adaptively controlling a reactive power produced by each non-failed Active Front End from each set of Active Front Ends to maintain a predetermined power factor for said AC power supply network without overloading any of said non-failed Active Front Ends;

identifying said failed Adaptive Front End;

identifying said non-failed Adaptive Front Ends;
determining said required power factor of said AC power supply network;
determining a required total machine power to supply said plurality of DC buses;
for each bus from said plurality of DC buses, determining said corresponding required DC bus power;
determining a VAR/Watt curve for each non-failed Active Front End;
determining an active power required to be delivered from each non-failed Active Front End;
determining a reactive power required to be delivered from each non-failed Active Front End;
determining an overload active power for each non-failed Active Front End; and/or
determining an overload reactive power for each non-failed Active Front End.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
active—a circuit and/or device that uses transistors, integrated circuits, and/or vacuum tubes to perform an action on an electrical source.
Active Front End (AFE)—a self-commutated, actively controlled rectifier, line converter, and/or regenerative feedback unit.
activity—an action, act, step, and/or process or portion thereof
adapted to—suitable, fit, and/or capable of performing a specified function.
alternating current (AC)—an electric current that reverses direction in a circuit at regular intervals.
alternator—a device adapted to convert mechanical energy to electrical energy. For the purposes of this application, the term "alternator" also includes generators.
and/or—either in conjunction with or in alternative to.
apparatus—an appliance and/or device for a particular purpose.
approximately—nearly the same as.
associate—to join, connect together, and/or relate.
asynchronous motor—a rotating device powered by electricity wherein phase differences between three phases of an electrical supply create a rotating electromagnetic field in the device. The device comprises a rotor and a stator. Through electromagnetic induction, the rotating magnetic field induces a current in stator windings, which in turn sets up a counterbalancing magnetic field that causes the rotor to turn in the direction the field is rotating. The rotor rotates slower than the rotating magnetic field produced by the electrical supply.
automatic—performed via an information device in a manner essentially independent of influence and/or control by a user. For example, an automatic light switch can turn on upon "seeing" a person in its view, without the person manually operating the light switch.
auxiliary device—non-power train devices associated with a vehicle, such as fans, blowers, windshield wipers, air conditioning, heaters, and/or pumps, etc.
auxiliary power system—a plurality of electrically coupled components adapted to deliver electrical power to auxiliary devices.
Boolean logic—a complete system for logical operations.
bus—an electrical conductor that makes a common connection between at least two circuits.
can—is capable of, in at least some embodiments.
cause—to bring about, provoke, precipitate, produce, elicit, be the reason for, result in, and/or effect.
circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.
comprising—including but not limited to.
configure—to make suitable or fit for a specific use or situation.
connect—to join or fasten together.
constant—continually occurring; persistent; and/or unchanging.
containing—including but not limited to.
continuously—uninterrupted in time, sequence, substance, and/or extent.
control—to exercise authoritative and/or dominating influence over;
direct; adjust to a requirement; and/or regulate.
convert—to transform, adapt, and/or change.
cool—to transfer thermal energy away.
cooling fluid—a fluid adapted to transfer heat energy.
correction—a change to a more desired value.
corresponding—related, associated, accompanying, similar in purpose and/or position, conforming in every respect, and/or equivalent and/or agreeing in amount, quantity, magnitude, quality, and/or degree.
couple—to join, connect, and/or link two things together.
coupleable—capable of being joined, connected, and/or linked together.
create—to bring into being.
crowd—to press, cram, and/or force together tightly.
curve—a plot and/or graphical representation of data.
data—distinct pieces of information, usually formatted in a special or predetermined way and/or organized to express concepts, and/or represented in a form suitable for processing by an information device.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.
define—to establish the outline, form, and/or structure of.
deliver—to give forth, produce, and/or transfer of possession of an item.
de-rate—lower the rated electrical capability of an electrical apparatus.
determine—to find out, obtain, calculate, decide, deduce, ascertain, and/or come to a decision, typically by investigation, reasoning, and/or calculation.

device—a machine, manufacture, and/or collection thereof.

digital—non-analog and/or discrete.

direct current (DC)—a non-alternating electric current.

double stator winding—a stationary part of a motor, dynamo, turbine or other working electrical machine with two separate windings on each pole. A rotor turns around the stator. Each of the two windings is adapted to receive power from a separate inverter.

drag—to cause to trail along a surface.

dragline—a large excavation machine used in surface mining to remove overburden (layers of rock and soil). A typical dragline casts a wire rope-hung bucket a considerable distance, collects the dug material by pulling the bucket toward itself on the ground with a second wire rope (or chain), elevates the bucket, and dumps the material on a spoil bank, in a hopper, and/or on a pile, etc.

drive—a means by which power is transmitted.

duty cycle—a fraction of time a system is actually employed in performing its function; a percentage of time a DC voltage is substantially non-zero.

electric—powered by electricity.

electrical motor—a motion-imparting device powered by electricity.

electrically coupled—objects connected or linked so as to allow a flow of electrons there between.

energized—supplied with an electrical current.

estimate—(n) a calculated value approximating an actual value; (v) to calculate and/or determine approximately and/or tentatively.

excavate—to move material, including any subterranean, submarine, and/or surface material.

excitation—a degree of intensity of an electromagnetic field in an alternator caused by the application of a current to the alternator stator.

execute—run a computer program or instruction.

fail—to designate and/or treat as functioning improperly and/or inoperative.

failure—a cessation of proper functioning or performance.

filter-less—an electrical system lacking a device adapted to reject signals of certain frequencies while allowing others to pass.

frequency—a number of electrical voltage and/or current oscillations in a predetermined time period.

from—used to indicate a source.

generate—to create, produce, give rise to, and/or bring into existence; and/or to produce electrical power.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

harmonic distortion—for an AC power signal, the ratio of a sum of the powers of all harmonic frequencies above and/or below a fundamental current frequency to the power of the fundamental current frequency.

harmonic filter—a device comprising a capacitor bank and an induction coil and that is designed and/or tuned to a predetermined non-linear load to eliminate and/or substantially attenuate a predetermined harmonic frequency range.

having—including but not limited to.

hoist—a system comprising motor adapted to at least vertically move a bucket of a dragline-mining machine.

human-machine interface—hardware and/or software adapted to render information to a user and/or receive information from the user; and/or a user interface.

Hz—an abbreviation for Hertz, which is a unit of frequency equal to one cycle per second.

identify—to recognize, detect, and/or specify.

including—including but not limited to.

independent—without dependence upon and/or regard for another.

inductors—a device adapted to induce current in an electrical circuit via a changing magnetic flux.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—related to electricity entering a device.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

instructions—directions, which can be implemented as firmware and/or software, the directions adapted to perform a particular operation or function.

Insulated Gate Bipolar Transistor (IGBT)—a semiconductor device that has identical operation to a bipolar transistor, but has a field effect type gate, so that when a gate-emitter voltage is applied to make it conductive, no current needs to be injected. When gate-emitter voltage is very low the device switches off.

internal combustion engine—a device in which fuel is oxidized such that energy within the fuel is converted to mechanical energy, such as turning a shaft. The fuel can be gasoline, diesel fuel, ethanol, methanol, and/or any other hydrocarbon-based fluid, etc.

inverter—a device that converts DC power to AC power.

limit—a point beyond which something cannot or may not proceed.

load—an amount of mined earthen material associated with a bucket and/or truck, etc.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1")), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine—a device and/or vehicle adapted to perform at least one task.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

maintain—to retain, preserve, sustain, keep in an existing state, and/or continue to obtain.

managing—controlling.

material—any substance that can be excavated and/or scooped.

may—is allowed and/or permitted to, in at least some embodiments.

measure—characterize by physically sensing.

measurement—a value of a variable, the value determined by manual and/or automatic observation.

mechanically coupled—at least a first object and a second object connected or linked so as to allow the first object to move physically in concert with the second object.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

mine—a site from which earthen materials can be extracted.

mining excavator—a machine for excavating material from the earth.

mining haul truck—a motor vehicle adapted to haul an extracted material.

modulated—varied with respect to frequency, amplitude, phase, or other characteristic.

motor—a device that transforms electrical, hydraulic, and/or pneumatic energy into mechanical energy that produces or imparts linear and/or angular motion.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

non—not.

off-road traction vehicle—a vehicle adapted for operation on earthen surfaces other than on paved surfaces. For example, off-road traction vehicles can comprise mining trucks, electric mining shovels, and/or electric mining excavators, etc.

operate—function.

output—something produced, and/or generated.

overload—to exceed a specification and/or design, overburden, and/or violate.

packet—a generic term for a bundle of data organized in a specific way for transmission, such as within and/or across a network, such as a digital packet-switching network (e.g., the Internet), and comprising the data to be transmitted and certain control information, such as a destination address.

perceptible—capable of being perceived by the human senses.

phase angle—an angle expressing a phase relation between an AC current and an AC voltage.

physical—tangible, real, and/or actual.

physically—existing, happening, occurring, acting, and/or operating in a manner that is tangible, real, and/or actual.

plurality—the state of being plural and/or more than one.

power—electrical energy usable to do work.

power factor—a ratio of true power to apparent power. A power factor of 1.0 indicates that current and voltage are in phase.

power factor compensating equipment—equipment adapted to change a phase relationship between an AC voltage and an AC current to a more desired value.

power sink—a device adapted to dissipate electrical energy by converting electrical energy usually to heat or mechanical energy.

power supply—one or more electrically coupled components configured to provide electrical energy to a device or system.

predetermined—established in advance.

probability—a quantitative representation of a likelihood of an occurrence.

processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

produce—to create.

project—to calculate, estimate, or predict.

propel—to cause to move forward and/or backward.

provide—to furnish, supply, give, and/or make available.

provision—(v.) to provide; (n.) the act, process, and/or result of providing; (n.) the thing provided.

Pulse Wave Modulated (PWM)—a method of regulating the output voltage and frequency of a switching power supply by varying the width, but not the height, of a train of pulses; and/or the modulation of duty cycle of a signal and/or power source to convey information over a communications channel and/or control the amount of power sent to a load.

pump—a machine adapted to raise, compress, and/or transfer a fluid.

range—an amount or extent of variation.

reactive AC current—a measure of a vectorial and/or imaginary component of an alternating current, that component not adapted to perform work.

reactive power—a measure of a vectorial and/or imaginary component of power, that component not adapted to perform work.

receive—to get as a signal, take, acquire, and/or obtain.

recommend—to suggest, praise, commend, and/or endorse.

rectifier—a device that converts AC power to DC power.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

required—necessary and/or essential.

responsive—reacting to an influence and/or impetus.

retard—to attempt to slow; to resist motion.

select—to make a choice or selection from alternatives.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality of predetermined elements; and/or one or more distinct items and/or entities having a specific common property or properties.

shovel—an electrically powered device adapted to dig, hold, and/or move ore.

signal—automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

sin(sine)—the ordinate of the endpoint of an arc of a unit circle centered at the origin of a Cartesian coordinate system, the arc being of length x and measured counter-clockwise from the point (1, 0) if x is positive or clockwise if x is negative.

sine wave—a wave with deviation that can be graphically expressed as the sine curve determinable by the equation $y=\sin(x)$.

sine wave output current—an electrical current oscillating about a central point wherein a graphical representation of the oscillation resembles a sine wave.

sinusoidal filter—an electrically coupled reactor and capacitor adapted to create sine waves of the output current of a frequency drive.

space vector modulated (SVM)—a form of pulse width modulation for regulating the output voltage and frequency of a signal characterized by varying the width, but not the height, of a train of pulses; and/or the time intervals between pulses. Space vector modulated signals are distinguished from other forms of pulse width modulated signals by the method of determining when the pulses begin and end. Space vector modulated pulses are timed via a calculated space vector.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

speed—a velocity.

stagger angle—a phase angle between times for switching on Active Front End units.

static—stationary and/or constant.

store—to place, hold, and/or retain data, typically in a memory.

substantially—to a great extent and/or degree.

support—to bear the weight of, especially from below.

swing—to move laterally and/or in a curve.

switched capacitor bank—a plurality of capacitors adapted to be automatically switched into an electrical power transmission circuit, usually to correct a power factor.

switching—turning on and/or off.

system—a collection of mechanisms, devices, machines, articles of manufacture, processes, data, and/or instructions, the collection designed to perform one or more specific functions.

temperature—measure of the average kinetic energy of the particles in a sample of matter, expressed in terms of units or degrees designated on a standard scale.

temperature sensor—a device adapted to provide a signal proportional to a temperature.

total—of, relating to, or constituting a whole.

traction motor—an electric motor mechanically coupled to provide motive force to move a machine.

transform—to change in measurable: form, appearance, nature, and/or character.

transformer—a device adaptable to transfer electric energy from one circuit to another. A transformer can comprise a pair of multiply wound, inductively coupled wire coils that effect such a transfer with a change in voltage, current, phase, and/or other electric characteristic.

transmit—to send as a signal, provide, furnish, and/or supply.

unmodulated—substantially constant. For example, a relatively constant DC voltage is unmodulated.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—an assigned or calculated numerical quantity.

VAR—a measure of reactive power variable—likely to change and/or vary, subject to variation, and/or changeable.

via—by way of and/or utilizing.

voltage—(a.k.a., "potential difference" and "electro-motive force" (EMF)) a quantity, expressed as a signed number of Volts (V), and measured as a signed difference between two points in an electrical circuit which, when divided by the resistance in Ohms between those points, gives the current flowing between those points in Amperes, according to Ohm's Law.

Watt—a measure of total power and/or active power.

wave—a disturbance, variation, and/or incident that causes the transfer electrical energy progressively from point to point in a medium.

waveform—a profile, graph, and/or visual model of variations of voltage and/or current over time.

weight—a value indicative of importance.

without—not accompanied by.

Note

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;
 no characteristic, function, activity, or element is "essential";
 any elements can be integrated, segregated, and/or duplicated;
 any activity can be repeated, any activity can be performed by multiple entities, and/or any activity can be performed in multiple jurisdictions; and
 any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
 via a predetermined information device, for a predetermined excavating machine comprising a plurality of Active Front Ends, each Active Front End electrically coupled to an AC power supply network of said predetermined excavating machine, each Active Front End adapted to provide a required DC bus power to a DC bus, said DC bus electrically coupled to a plurality of inverters, each inverter adapted to supply AC power to at least one operating motor:
  identifying at least one deselected Active Front End in the plurality of Active Front Ends;
  identifying at least one selected Active Front End in the plurality of Active Front Ends;
  determining a required active power of said AC power supply network;
  determining a required power factor for said AC power supply network; and
  based on said required active power of said AC power supply network, independently controlling a reactive power produced by each of said at least one selected Active Front End to maintain said required power factor for said AC power supply network.

2. A method comprising:
 via a predetermined information device, for a predetermined excavating machine comprising a plurality of sets of Active Front Ends, each set of Active Front Ends electrically coupled to an AC power supply network of said predetermined excavating machine, each set of Active Front Ends adapted to provide a required DC bus power to a predetermined DC bus from a plurality of DC buses, each DC bus from said plurality of DC buses electrically coupled to a plurality of inverters, each inverter adapted to supply AC power to a plurality of operating motors:
  responsive to identifying a failed Adaptive Front End from a first set of Active Front Ends, causing provision of said required DC bus power to be maintained while adaptively controlling a reactive power produced by each non-failed Active Front End from said first set of Active Front Ends to maintain a predetermined power factor for said AC power supply network.

3. A method comprising:
 via a predetermined information device, for a predetermined excavating machine comprising a plurality of sets of Active Front Ends, each set of Active Front Ends electrically coupled to an AC power supply network of said predetermined excavating machine, each set of Active Front Ends adapted to provide a corresponding required DC bus power to a corresponding DC bus from a plurality of DC buses, each DC bus from said plurality of DC buses electrically coupled to a plurality of inverters, each inverter adapted to supply AC power to a plurality of operating motors:
  responsive to identifying a failed Adaptive Front End from a first set of Active Front Ends serving a first DC bus from said plurality of DC buses, causing provision of a corresponding required DC bus power to said first DC bus to be maintained while adaptively controlling a reactive power produced by each non-failed Active Front End from each set of Active Front Ends to maintain a predetermined power factor for said AC power supply network without overloading any of said non-failed Active Front Ends.

4. The method of claim 3, further comprising:
identifying said failed Adaptive Front End.

5. The method of claim 3, further comprising:
identifying said non-failed Adaptive Front Ends.

6. The method of claim 3, further comprising:
determining said required power factor of said AC power supply network.

7. The method of claim 3, further comprising:
determining a required total machine power to supply said plurality of DC buses.

8. The method of claim 3, further comprising:
for each bus from said plurality of DC buses, determining said corresponding required DC bus power.

9. The method of claim 3, further comprising:
determining a VAR/Watt curve for each non-failed Active Front End.

10. The method of claim 3, further comprising:
determining an active power required to be delivered from each non-failed Active Front End.

11. The method of claim 3, further comprising:
determining a reactive power required to be delivered from each non-failed Active Front End.

12. The method of claim 3, further comprising:
determining an overload active power for each non-failed Active Front End.

13. The method of claim 3, further comprising:
determining an overload reactive power for each non-failed Active Front End.

14. A non-transitory machine-readable medium storing machine-implementable instructions defining:
  for a predetermined excavating machine comprising a plurality of sets of Active Front Ends, each set of Active Front Ends electrically coupled to an AC power supply network of said predetermined excavating machine, each set of Active Front Ends adapted to provide a corresponding required DC bus power to a corresponding DC bus from a plurality of DC buses, each DC bus from said plurality of DC buses electrically coupled to a plurality of inverters, each inverter adapted to supply AC power to a plurality of operating motors:
    responsive to identifying a failed Adaptive Front End from a first set of Active Front Ends serving a first DC bus from said plurality of DC buses, causing provision of a corresponding required DC bus power to said first DC bus to be maintained while adaptively controlling a reactive power produced by each non-failed Active Front End from each set of Active Front Ends to maintain a predetermined power factor for said AC power supply network without overloading any of said non-failed Active Front Ends.

* * * * *